J. S. PHILLIPPY & G. L. ELSER.
Grinding-Mills.
No. 147,429.  Patented Feb. 10, 1874.
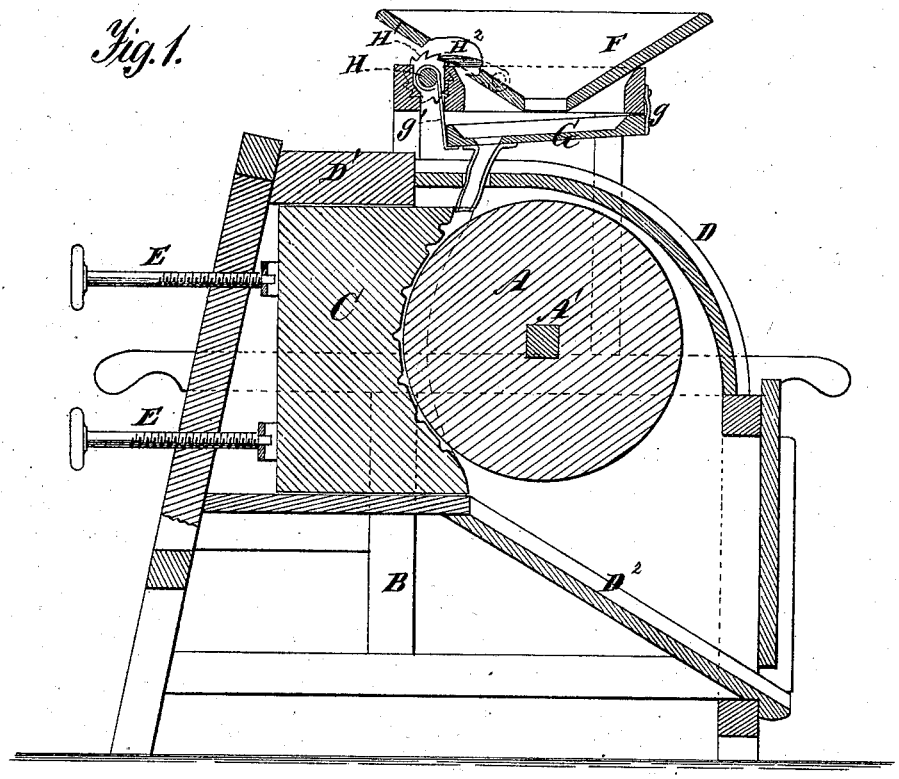
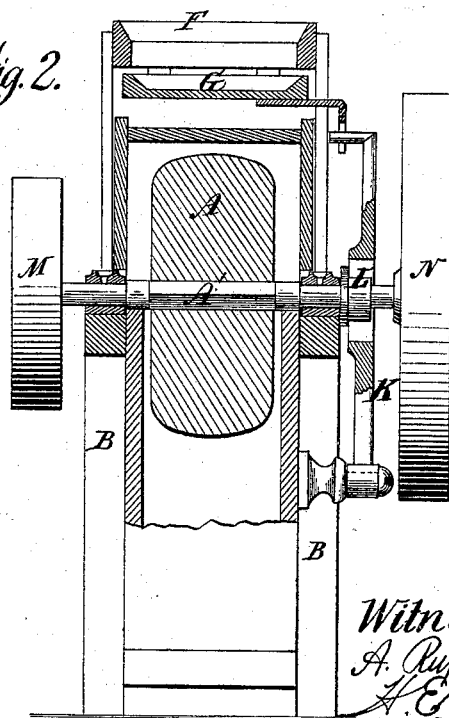
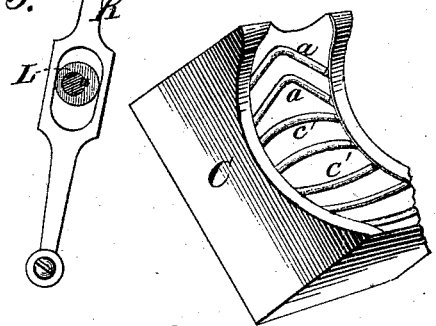

UNITED STATES PATENT OFFICE.

JOHN S. PHILLIPPY, OF SHAFFERSTOWN, AND GEORGE L. ELSER, OF DURLACH, PENNSYLVANIA.

IMPROVEMENT IN GRINDING-MILLS.

Specification forming part of Letters Patent No. 147,429, dated February 10, 1874; application filed January 22, 1874.

*To all whom it may concern:*

Be it known that we, JOHN S. PHILLIPPY, of Shafferstown, in the county of Lebanon and State of Pennsylvania, and GEORGE L. ELSER, of Durlach, in the county of Lancaster, of the same State, have invented certain Improvements in Grinding-Mills, of which the following is a specification:

Our invention relates to that class of grinding-mills in which the material is ground between a concave or curb, and a runner-stone revolving in a vertical plane on a horizontal axis, the grinding-surfaces being of curved outline in transverse section, as well as in the direction of the periphery of the runner.

Our improvement consists in the employment of a concave, arranged in a vertical position upon one side of the runner, and provided on top with one or more angle-furrows to distribute the grain evenly over the entire width of the grinding-surfaces on entering between them, the rest of the furrows being cut in straight lines and at right angles to the grinding-edge of the runner-stone, which is left smooth. The peculiar dress of the concave above stated, we have, by actual test, found to be essential to the proper action of the mill, when the concave is arranged vertically. Neither a dress consisting wholly of angular furrows, nor one composed entirely of straight ones, will answer the purpose in such case; and the upright position of the concave is also of the greatest importance where the grinding-surfaces have the form described, as it insures a natural feed and discharge, and an easy action of the mill, whereas, by placing it horizontally under the runner, with each end reaching some distance up on the edge thereof, a wallowing action results, greater power is required to grind a given quantity of grain in a given time, and the product is less uniform in quality.

In the annexed drawings, Figure 1 is a vertical longitudinal section of our improved mill. Fig. 2 is a transverse section thereof. Fig. 3 is a view of the shoe, and mechanism for operating it. Fig. 4 is a perspective view of the concave.

The same letters of reference are used in all the figures in the designation of identical parts.

The runner-stone A is fast upon a horizontal shaft, A', the journals of which turn in bearings upon the side timbers of a suitable frame, B, to which the principal portion of the casing inclosing the runner and the concave C is secured. The top parts D and $D^1$ of the casing are removable to admit of ready access to the stones, and of their removal, if necessary. The concave stands in an upright position, in line with the runner upon the bottom of the casing, and may be adjusted to and from the runner by screws E E, in the ordinary manner. The form of the grinding-edge of the runner is best exhibited in Fig. 2, that of the concave being the counterpart thereto. The convex grinding-edge of the runner is left smooth, but in the concavity of the concave furrows are cut, the uppermost two, $a$ $a$, of which are angle-furrows, while the remaining ones are cut straight across, as at $c'$, $c'$, &c., for the purposes heretofore explained. The material to be ground falls from the hopper F into the shoe G underneath, which is swung at one end from an elevated frame by straps $g$, and at the other or feed end from a shaft or drum, H, by a strap $g'$. The feed is regulated by changing the inclination of the shoe G through winding up or unwinding the strap $g'$, and the shoe is maintained at the required inclination by locking the drum H by means of a pawl, $H^2$, thrown over to engage the ratchet-wheel $H^1$ on said drum. The grain passes through a hole in the feed end of the shoe into a flexible conductor, I, from which it flows between the stones, and, ground into meal, leaves the mill through the chute $D^2$ of the casing. The shoe is reciprocated by an oscillating lever, K, pivoted on one side of the frame-work, and operated by a cam, L, on the shaft of the runner-stone. The shaft $A^1$ extends beyond its bearing, and carries at its ends, respectively, a driving-pulley, M, and a fly-wheel, N.

What we claim as our invention, and desire to secure by Letters Patent, is—

The combination of the vertically-revolving runner and the concave, having the curved grinding-surfaces stated, when the concave is arranged in an upright position, and has a dress composed of one or more distributing angle-furrows, a, and straight furrows c′, all substantially as and for the purposes specified.

In testimony whereof we have signed our names to the foregoing specification in the presence of two subscribing witnesses.

JOHN S. PHILLIPPY.
GEORGE L. ELSER.

Witnesses:
WM. REIST,
GEORGE F. MILLER.